United States Patent
Griffith et al.

(10) Patent No.: US 7,198,104 B2
(45) Date of Patent: Apr. 3, 2007

(54) SUBTERRANEAN FLUIDS AND METHODS OF CEMENTING IN SUBTERRANEAN FORMATIONS

(75) Inventors: James E. Griffith, Loco, TX (US); Lance E. Brothers, Chickasha, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 346 days.

(21) Appl. No.: 10/852,461

(22) Filed: May 24, 2004

(65) Prior Publication Data

US 2005/0034867 A1 Feb. 17, 2005

Related U.S. Application Data

(63) Continuation-in-part of application No. 10/639,702, filed on Aug. 12, 2003, now Pat. No. 7,147,056.

(51) Int. Cl.
*E21B 33/14* (2006.01)

(52) U.S. Cl. .................................... 166/294
(58) Field of Classification Search ............... None
See application file for complete search history.

(56) References Cited

U.S. PATENT DOCUMENTS

| | | | |
|---|---|---|---|
| 3,533,828 A | 10/1970 | Rowe | 117/47 |
| 4,126,003 A | 11/1978 | Tomie | 405/261 |
| 4,618,369 A | 10/1986 | Smith-Johannsen | 106/95 |
| 5,295,543 A | 3/1994 | Terry et al. | 166/293 |
| 5,327,968 A | 7/1994 | Onan et al. | 166/293 |
| 5,355,954 A | 10/1994 | Onan et al. | 166/292 |
| 5,372,641 A | 12/1994 | Carpenter | |
| 5,383,521 A | 1/1995 | Onan et al. | 166/293 |
| 5,389,145 A | 2/1995 | Gupta et al. | 106/807 |
| 5,392,852 A | 2/1995 | Laurel et al. | |
| 5,398,758 A | 3/1995 | Onan et al. | 166/292 |
| 5,711,383 A | 1/1998 | Terry et al. | 175/72 |
| 5,913,364 A | 6/1999 | Sweatman | 166/281 |
| 5,935,444 A | 8/1999 | Johnson et al. | |
| 6,024,170 A | 2/2000 | McCabe et al. | |
| 6,060,434 A | 5/2000 | Sweatman et al. | 507/216 |
| 6,077,888 A | 6/2000 | Schilling | |
| 6,138,759 A | 10/2000 | Chatterji et al. | 166/293 |
| 6,167,967 B1 | 1/2001 | Sweatman | 166/281 |
| 6,187,719 B1 | 2/2001 | Dino et al. | |
| 6,204,224 B1 | 3/2001 | Quintero et al. | |
| 6,235,201 B1 | 5/2001 | Smith et al. | |
| 6,258,757 B1 | 7/2001 | Sweatman et al. | 507/219 |
| 6,315,042 B1 | 11/2001 | Griffith et al. | 166/291 |
| 6,352,952 B1 | 3/2002 | Jardine et al. | 501/141 |
| 6,524,384 B2 | 2/2003 | Griffith et al. | 106/705 |
| 6,666,268 B2 | 12/2003 | Griffith et al. | 166/292 |
| 6,668,929 B2 | 12/2003 | Griffith et al. | 166/292 |
| 6,689,208 B1 | 2/2004 | Brothers | 106/794 |
| 6,716,282 B2 | 4/2004 | Griffith et al. | 106/705 |
| 6,815,399 B1 | 11/2004 | Johnson et al. | 507/211 |
| 6,845,820 B1 | 1/2005 | Hebert et al. | |
| 2002/0035041 A1 | 3/2002 | Griffith et al. | 507/200 |
| 2003/0116065 A1 | 6/2003 | Griffith et al. | 106/705 |
| 2003/0121456 A1 | 7/2003 | Griffith et al. | 106/724 |
| 2003/0121660 A1 | 7/2003 | Griffith et al. | 166/292 |

FOREIGN PATENT DOCUMENTS

| | | |
|---|---|---|
| EP | 1 138 740 A1 | 10/2001 |
| GB | 2 329 657 A | 3/1999 |
| GB | 2 342 671 A | 4/2000 |

OTHER PUBLICATIONS

Foreign communication from a related counterpart application dated Dec. 27, 2005.
Halliburton brochure entitled "HR®-5 Cement Additive" dated 1998.
Halliburton brochure entitled "HR®-15 Cement Retarder" dated 1999.
Paper entitled "Deepwater Cementing Challenges—An Overview of Offshore Brazil, Gulf of Mexico, and West Africa," by George Fuller et al.
Paper entitled "Practices for Providing Zonal Isolation in Conjunction With Expandable Casing Jobs-Case Histories," by Tom Sanders et al., dated 2003.
SPE 77751 paper entitled "Use of Settable Spotting Fluid Improves Expandable Casing Process-Case History," by Oladele O. Owoeye et al., dated 2002.

*Primary Examiner*—Zakiya W. Bates
(74) *Attorney, Agent, or Firm*—Craig W. Roddy; Baker Botts, L.L.P.

(57) ABSTRACT

Subterranean fluids, and more particularly, subterranean fluids comprising a hydraulic cement in an invert emulsion, and methods of using such fluids in subterranean operations, are provided. An example of these methods is a method of cementing a well bore. Another example of these methods is a method of reducing the cost to cement a well bore in a subterranean formation.

51 Claims, No Drawings

SUBTERRANEAN FLUIDS AND METHODS OF CEMENTING IN SUBTERRANEAN FORMATIONS

CROSS-REFERENCE TO RELATED APPLICATION

This application is a continuation-in-part of U.S. application Ser. No. 10/639,702 entitled "Subterranean Fluids and Methods of Using These Fluids in Subterranean Formations," filed on Aug. 12, 2003, now U.S. Pat. No. 7,147,056 incorporated by reference herein for all purposes, and from which priority is claimed pursuant to 35 U.S.C. § 120.

BACKGROUND OF THE INVENTION

The present invention relates to subterranean fluids, and more particularly, to subterranean fluids comprising a hydraulic cement and an invert emulsion, and methods of using such fluids in subterranean operations.

During the drilling of a well bore in a subterranean formation, a drilling fluid may be circulated through a drill pipe and drill bit into the well bore, and subsequently flow upward through the well bore to the surface. The drilling fluid, inter alia, cools the drill bit, lubricates the rotating drill pipe to prevent it from sticking to the walls of the well bore, prevents blowouts by providing hydrostatic pressure to counteract the sudden entrance into the well bore of high pressure formation fluids, and removes drilled cuttings from the well bore. Typically, after a well bore is drilled to a desired final depth, the drill pipe and drill bit are withdrawn from the well bore and the drilling fluid is left therein so as to, inter alia, provide hydrostatic pressure on permeable formations penetrated by the well bore, thereby preventing the flow of formation fluids into the well bore.

A common subsequent step in completing the well bore usually involves placing a pipe string (e.g., casing), into the well bore. Depending upon factors such as, inter alia, the depth of the well bore and any difficulties in placing the pipe string therein, the drilling fluid may remain relatively static in the well bore for an extended period of time (e.g., up to about 2 weeks). While drilling fluids generally are not settable (e.g., they do not set into hard impermeable sealing masses when static), drilling fluids may increase in gel strength over time. Accordingly, the drilling fluid progressively may increase in gel strength, during the time in which it remains static, such that portions of the drilling fluid in the well bore may become increasingly difficult to displace.

Upon placement of the pipe string in the well bore, primary cementing typically is performed. This commonly involves cementing the pipe string disposed in the well bore by pumping a cement composition through the pipe string and into an annulus between the pipe string and the walls of the well bore, thereby displacing the drilling fluid in the annulus. However, if the drilling fluid has developed sufficient gel strength while in the well bore, an operator may be unable to displace all of the drilling fluid with the cement composition. Accordingly, the cement composition may bypass portions of the drilling fluid in the well bore. This may be problematic, inter alia, because the drilling fluid generally is not settable; therefore, formation fluids may enter and flow along the well bore, which is highly undesirable.

Operators have attempted to solve this problem by developing settable spotting fluid compositions, inter alia, to displace drilling fluids from well bores promptly after their use. However, these methods often have not met with success, as conventional settable spotting fluids commonly include blast furnace slag and other hydraulic components that may begin to set at relatively low temperatures, e.g., temperatures less than about 90° F. Also, certain slag-containing settable spotting fluids may be intolerant to cement composition contamination, causing the settable spotting fluids to set prematurely upon contact with well cement. Operators often attempt to counteract this tendency to prematurely set by adding a strong set retarder to the spotting fluid, and/or by separating the spotting fluid from the cement composition through the use of a spacer fluid.

Conventional settable spotting fluids also may demonstrate other problems, including, but not limited to, undesirable instability as well as a general inability to develop significant compressive strength upon setting. For example, the invert emulsions found in many conventional settable spotting fluids typically become unstable within about one week after their formulation. This is problematic, inter alia, because it often necessitates formulating the invert emulsion shortly before placing the settable spotting fluid in a subterranean formation. If an excessive amount of the invert emulsion is formed, it generally cannot be re-used and often is disposed of, which disposal may further increase the cost of a particular job. Furthermore, the general inability of most conventional settable spotting fluids to develop significant compressive strength upon setting also is problematic, because, inter alia, where formation fluids are present under a pressure sufficient to overcome the settable spotting fluid's low compressive strength, such formation fluids may continue to enter and flow along the well bore, which is undesirable and defeats a major purpose of using settable spotting fluids, which is to provide zonal isolation.

SUMMARY OF THE INVENTION

The present invention relates to subterranean fluids, and more particularly, to subterranean fluids comprising a hydraulic cement and an invert emulsion, and methods of using such fluids in subterranean operations.

An example of a method of the present invention is a method of cementing a well bore, comprising: introducing a well fluid comprising hydraulic cement, an oil viscosifier, and an invert emulsion into a well bore containing an oil-based drilling fluid so as to displace at least a portion of the oil-based drilling fluid from the well bore; disposing a pipe string in the well bore so as to create an annulus between the pipe string and the well bore such that a portion of the well fluid resides in the annulus and a portion of the well fluid resides in the pipe string; flowing a cement composition through the pipe string and into the annulus so as to displace the portion of the well fluid out of the pipe string and into the annulus; and allowing both the well fluid and cement composition to develop compressive strength along a desired length of the well bore.

Another example of a method of the present invention is a method of reducing the cost to cement a well bore in a subterranean formation, comprising the step of using a well fluid to form a portion of a cement sheath along the well bore, wherein the well fluid comprises a hydraulic cement, an oil viscosifier, and an invert emulsion.

The features and advantages of the present invention will be readily apparent to those skilled in the art upon a reading of the description of the preferred embodiments that follows.

DESCRIPTION OF EMBODIMENTS

The present invention relates to subterranean fluids, and more particularly, to subterranean fluids comprising a hydraulic cement and an invert emulsion, and methods of using such fluids in subterranean operations.

The subterranean well fluids of the present invention generally comprise water, an oil, an emulsifying surfactant for emulsifying the oil with water whereby an invert (e.g., oil-external) emulsion is formed, a hydraulic cement, and an oil viscosifier. Other additives suitable for use in subterranean formations also may be added to these well fluids if desired. Generally, the invert emulsion is present in the well fluids of the present invention in an amount in the range of from about 20% to about 60% by weight. In certain embodiments, the invert emulsion is present in the well fluids of the present invention in an amount in the range of from about 30% to about 55% by weight. Generally, the subterranean well fluids of the present invention have a density in the range of from about 11 to about 17 pounds per gallon.

Any oil may be used with the subterranean well fluids of the present invention. In certain embodiments, the oil comprises one or more long-chain hydrocarbons. A particularly suitable mixture of long-chain hydrocarbons is commercially available under the trade designation "ESCAID 110™" from the ExxonMobil Corporation. Generally, the oil is present in the well fluids of the present invention in an amount in the range of from about 40% to about 70% by volume of the invert emulsion. In certain embodiments, the oil is present in the well fluids of the present invention in an amount in the range of from about 45% to about 55% by volume of the invert emulsion.

The water used in the subterranean well fluids of the present invention may be fresh water, saltwater (e.g., water containing one or more salts dissolved therein), brine (e.g., saturated saltwater), or seawater. Generally, the water may be from any source provided that it does not contain an excess of compounds (e.g., dissolved inorganics, such as tannin), that may adversely affect other components in the cement composition. The water may be present in the well fluids of the present invention in an amount sufficient to form a pumpable slurry. More particularly, the water is present in the well fluids of the present invention in an amount in the range of from about 30% to about 60% by volume of the invert emulsion. In certain embodiments, the water is present in the well fluids of the present invention in an amount in the range of from about 45% to about 55% by volume of the invert emulsion.

A wide variety of emulsifying surfactants may be used in the well fluids of the present invention to emulsify the oil with water. An example of a particularly suitable emulsifying surfactant is a Tallow di-amine substituted with 3 moles of ethylene oxide that is available from Special Products, Inc., in Houston, Tex. Such emulsifying surfactant comprises about 60% active ingredient. Generally, the emulsifying surfactant may be present in the invert emulsion in an amount in the range of from about 5% to about 15% by weight of the oil. In certain embodiments, the emulsifying surfactant may be present in the invert emulsion in an amount in the range of from about 7.5% to about 12% by weight of the oil.

Any hydraulic cement suitable for use in subterranean applications may be used in the present invention. In certain embodiments, the hydraulic cement is a Portland cement. Generally, the hydraulic cement is present in the well fluids of the present invention in an amount in the range of from about 25% to about 60% by weight. In certain embodiments, the hydraulic cement is present in the well fluids of the present invention in an amount in the range of from about 50% to about 60% by weight.

Alternatively, the hydraulic cement may comprise fly ash. As referred to herein, the term "fly ash" refers to the finely divided residue that results from the combustion of ground or powdered coal and is carried by the flue gases generated therefrom. ASTM Class C or equivalent fly ash contains both silica and calcium, and when mixed with water forms a cementitious mixture that sets into a hard impermeable mass, e.g., calcium silicate hydrate. In certain other embodiments, the hydraulic cement may comprise a source of calcium ion along with vitrified shale or Class F or equivalent fly ash. ASTM Class F fly ash does not contain a reactive form of calcium, and an external source of calcium ion generally is required for it to form a cementitious composition with water. Generally, hydrated lime may be mixed with Class F or the equivalent fly ash in an amount in the range of from about 5% to about 50% by weight of the fly ash. As referred to herein, the term "hydrated lime" will be understood to mean calcium hydroxide $(Ca(OH)_2)$. Where the hydraulic cement comprises vitrified shale or fly ash, the hydraulic cement generally is present in the well fluids of the present invention in an amount in the range of from about 50% to about 70% by weight; in certain embodiments, the hydraulic cement may be present in an amount in the range of from about 55% to about 65% by weight. Where the hydraulic cement comprises fly ash, certain embodiments of the well fluids of the present invention may use ASTM Class F fly ash together with hydrated lime. Where the hydraulic cement comprises vitrified shale, a source of calcium ion (e.g., hydrated lime) generally is required for it to form a cementitious composition with water. An example of a suitable vitrified shale is commercially available under the trade name "PRESSUR-SEAL® FINE LCM" from TXI Energy Services, Inc., in Houston, Tex. An example of a suitable hydrated lime is commercially available from Continental Lime, Inc., of Salt Lake City, Utah.

The well fluids of the present invention comprise an oil viscosifier. Any known viscosifier that is compatible with an oil may be suitable for use in the well fluids of the present invention. An example of a suitable oil viscosifier is an organophilic clay commercially available under the trade name "CLAYTONE II" from Southern Clay Products, Inc., of Princeton, N.J. Where present, the oil viscosifier may be included in the well fluids of the present invention in an amount sufficient to provide a well fluid having a desired viscosity. More particularly, the oil viscosifier may be present in the well fluids of the present invention in an amount in the range of from about 0.01% to about 2% by weight of the invert emulsion. In certain embodiments, the oil viscosifier may be present in the well fluids of the present invention in an amount in the range of from about 0.25% to about 0.6% by weight of the invert emulsion.

Optionally, the well fluids of the present invention further may comprise a set retarder. Examples of suitable set retarders include those that are commercially available from Halliburton Energy Services, Inc., of Duncan, Okla., under the trade names "HR®-5," and "HR®-15." When used in well fluids of the present invention, the amount of set retarder present typically ranges from about 0.01% to about 4% by weight of the hydraulic cement, although other concentrations are possible within the teachings of the present invention. In certain embodiments, the set retarder may be present in the well fluids of the present invention in an amount in the range from about 0.01% to about 1% by weight of the hydraulic cement. Furthermore, the exact amount of set retarder chosen for a particular application may vary, depending on a variety of factors including, but not limited to, the temperature of the well into which the well fluid is to be introduced.

Optionally, the well fluids of the present invention further may comprise other additives as deemed appropriate by one skilled in the art with the benefit of this disclosure. Examples of such additives include, inter alia, fluid loss control additives, salts, fumed silica, weighting agents, microspheres, defoaming agents, and the like.

The well fluids of the present invention may be prepared in a variety of ways. Generally, the well fluids may be prepared by dispersing the surfactant into the oil at low shear. The organophilic clay generally is added to the oil at this time (e.g., after the surfactant). Water then may be added at a slightly higher shear. The resulting mixture then may be subjected to high shear, inter alia, to form an emulsion. Afterwards, any dry blended materials (e.g., the hydraulic cement) may be added.

Among other benefits, the well fluids of the present invention do not significantly increase in gel strength over time, and generally are displaced easily after being static in the well bore for a long period of time, e.g., a time period of about one week or more. Among other benefits, if the well fluids of the present invention are permitted to remain in an annulus in a well bore, they ultimately will set into a solid mass, thereby facilitating zonal isolation. Among other benefits, the oil-external emulsion formed within the well fluids of the present invention may be stable for a period of time up to about 3 weeks, thereby, inter alia, permitting the invert emulsion to be prepared as a separate component of the well fluid and sent to a job site far in advance of its use. The stability of the oil-external emulsion formed within the well fluids of the present invention, inter alia, may permit any unused portion of the invert emulsion to be returned, and re-used in a subsequent operation, without necessitating disposal.

In certain embodiments, the well fluids of the present invention may be used to at least partially displace an oil-based drilling fluid resident within a well bore drilled to total depth where the oil-based drilling fluid has not yet gained significant gel strength. The oil-based drilling fluid may have been unable to gain static gel strength due to, inter alia, its constant circulation through equipment such as the drill pipe, drill bit, and pumps. Generally, the well fluids of the present invention may displace the oil-based drilling fluid to a level above those portions of the well bore that contain fractures and other permeable areas or zones. After the well bore has been filled at least partially with a well fluid of the present invention, the pipe string to be cemented may be placed into the well bore. Some amount of oil-based drilling fluid may be present within the pipe string during this time. When the well cement composition is pumped through the pipe string into the annulus, it may readily displace the fluids within the pipe string and annulus. Any amount of the well fluids of the present invention that may remain in fractures or other permeable areas or zones in the well bore after the annulus has been filled with the well cement composition ultimately will set therein, due to, inter alia, the ability of the well fluids to develop compressive strength upon setting, thereby preventing the undesirable entry into, or flow of formation fluids within, the annulus. In certain embodiments where the casing is subjected to an internal pressure test after the well cement composition has set—which pressure test potentially could crack a portion of the set well cement composition—the presence (post-cementing) of a portion of the well fluids of the present invention in fractures or other permeable areas within the well bore may permit such portion of the well fluids of the present invention to flow into the cracks within the cement and set therein, thereby enhancing the integrity of the set well cement composition.

In another embodiment, the well fluids of the present invention may be used to form at least a portion of a cement sheath of a well bore (e.g., the well fluids of the present invention may be used as a "lead" or "filler" cement), thereby reducing the amount of conventional cement composition required to cement a given length of well bore. For example, an operator may use an oil-based drilling fluid to drill a well bore to a desired depth. A well fluid of the present invention then may be used to at least partially displace the oil-based drilling fluid that is resident within the well bore, at a time when the oil-based drilling fluid has not yet gained significant gel strength. This may be accomplished, inter alia, by pumping the well fluid of the present invention through the drill pipe and into the annulus between the drill pipe and the walls of the well bore. After the well bore has been filled at least partially with a well fluid of the present invention, the drill pipe may be removed from the well bore. At this point, the differing densities of the oil-based drilling fluid that remains in the well bore and the well fluid of the present invention may cause the oil-based drilling fluid to stratify atop the well fluid of the present invention, forming an interface between the two fluids. Next, the casing to be cemented may be placed into the well bore to a desired degree. In certain embodiments, the casing may be inserted at or about the interface between the oil-based drilling fluid and the well fluid of the present invention. An additional portion of a well fluid of the present invention then may be placed in the well bore (e.g., by pumping the additional portion of the well fluid through the casing), so that the remainder of the oil-based drilling fluid is displaced out of the well bore through the annulus between the casing and the walls of the well bore. The remainder of the casing then may be placed within the well bore. A cement composition then may be pumped through the casing and into the annulus, at least partially displacing the well fluid of the present invention into the annulus ahead of the cement composition. In embodiments such as this, the well fluid of the present invention may be permitted to remain in place in a portion of the annulus that is uphole (e.g., nearer to the well head) of the cement composition. In these embodiments where the well fluids of the present invention are used to form at least a portion of the cement sheath, the well fluids generally will not comprise a set retarder, or will comprise a set retarder in an amount less than about 1% by weight. Because these embodiments of the well fluids of the present invention contain minimal or no set retarder, the well fluid then may begin to set and build sufficient compressive strength to form at least a "lead" portion of the cement sheath of the well bore. Below the "lead" portion of the cement sheath formed using the well fluid of the present invention, the cement composition placed in the well bore after the well fluid also may set and form the downhole portion of the cement sheath. This may allow an operator to use a reduced amount of cement composition to form the cement sheath, helping to alleviate total cementing costs. For example, an operator desiring to cement 5,000 linear feet of well bore may displace an oil-based drilling fluid with, e.g., 3,000 linear feet of a well fluid of the present invention, then use 2,000 linear feet of a cement composition to at least partially displace the well fluid, such that the lowermost 2,000 linear feet of the cement sheath are at least partially formed using the well cement composition, while the uppermost 3,000 linear feet of the cement sheath are at least partially formed using the well fluid of the present invention. In certain embodiments, the well fluids of the present invention may be present in the cement sheath in an amount in the range of from about 0.01% to about 75% of the volume of the cement sheath.

In yet another embodiment, the well fluids of the present invention may be used in connection with the installation of expandable casing. For example, expandable casing may be placed within a well bore comprising a well fluid of the present invention, after which the expandable casing may be expanded out, and the well fluid of the present invention may be permitted to set. Optionally, a cementing plug may be displaced into the casing, inter alia, so as to displace the portion of the well fluid resident within the casing before the well fluid sets. Alternatively, after permitting the well fluid of the present invention to set, the portion of the well fluid within the casing may be drilled out. Expandable screens also may be used in accordance with the well fluids of the present invention.

While a number of embodiments described herein relate to subterranean well cementing, it will be understood that other well treatment fluids, including, but not limited to, spacer fluids, may also be prepared according to the present invention. As referred to herein, the term "spacer fluid" will be understood to mean a fluid placed within a well bore to separate fluids, e.g., to separate a drilling fluid within the well bore from a cement composition that subsequently will be placed within the well bore. For example, after an operator has drilled a well bore to a desired depth using an oil-based drilling fluid, the operator may remove the drill pipe and insert the casing to be cemented into the well bore. The operator then may place a desired amount of a well fluid of the present invention into the well bore. In certain embodiments, the well fluid may be placed in the well bore in an amount sufficient to fill the casing and a portion of the annulus between the casing and the walls of the well bore. The operator then may place a cement composition into the well bore (e.g., through the casing).

An example of a method of the present invention is a method of cementing a well bore, comprising: introducing a well fluid comprising hydraulic cement, an oil viscosifier, and an invert emulsion of oil, water, and a surfactant into a well bore containing an oil-based drilling fluid so as to displace at least a portion of the oil-based drilling fluid from the well bore; disposing a pipe string in the well bore so as to create an annulus between the pipe string and the well bore such that a portion of the well fluid resides in the annulus and a portion of the well fluid resides in the pipe string; flowing a cement composition through the pipe string and into the annulus so as to displace the portion of the well fluid out of the pipe string and into the annulus; and allowing both the well fluid and cement composition to develop compressive strength along a desired length of the well bore. Generally, the well fluid and cement composition will develop sufficient compressive strength to form a cement sheath that provides zonal isolation along the well bore.

Another example of a method of the present invention is a method of reducing the cost to cement a well bore in a subterranean formation, comprising the step of using a well fluid to form a portion of a cement sheath along the well bore, wherein the well fluid comprises a hydraulic cement, an oil viscosifier, and an invert emulsion. Optionally, additional steps may include, inter alia, using a cement composition to form a portion of the cement sheath (e.g., the remainder of the cement sheath).

A preferred example of a fluid composition that may be used with the present invention comprises: 108 grams of long-chain hydrocarbons, 10 grams of surfactant comprising a Tallow di-amine substituted with 3 moles of ethylene oxide, 2.16 grams organophilic clay, 135 grams of water, and 250 grams Portland cement.

To facilitate a better understanding of the present invention, the following examples of some embodiments are given. In no way should such examples be read to limit, or to define, the scope of the invention.

EXAMPLE 1

Rheological testing was performed on various sample compositions, in order to compare the compatibility of the well fluids of the present invention with conventional oil-based drilling fluids. The testing was performed on a Fann Model 35 viscometer at 140° F. per API Recommended Practice 10B.

Sample Composition No. 1 comprised an oil-based drilling fluid containing 11 lb/gal of Accolade drilling fluid.

Sample Composition No. 2 comprised 95% by volume of an oil-based drilling fluid (having the same composition as Sample Composition No. 1) and 5% by volume of a well fluid of the present invention having a density of 11.6 lb/gallon and comprising an emulsion that comprised 108 grams ESCAID 110, 10 grams surfactant, 2.16 grams organophilic clay, and 135 grams of water mixed with 250 grams of Portland Cement.

Sample Composition No. 3 comprised 75% by volume of an oil-based drilling fluid (having the same composition as Sample Composition No. 1) and 25% by volume of a well fluid of the present invention (having the same composition as the well fluid described above in the description of Sample Composition No. 2).

Sample Composition No. 4 comprised 50% by volume of an oil-based drilling fluid (having the same composition as Sample Composition No. 1) and 50% by volume of a well fluid of the present invention (having the same composition as the well fluid described above in the description of Sample Composition No. 2).

Sample Composition No. 5 comprised 25% by volume of an oil-based drilling fluid (having the same composition as Sample Composition No. 1) and 75% by volume of a well fluid of the present invention (having the same composition as the well fluid described above in the description of Sample Composition No. 2) by volume.

Sample Composition No. 6 comprised 5% by volume of an oil-based drilling fluid (having the same composition as Sample Composition No. 1) and 95% by volume of a well fluid of the present invention (having the same composition as the well fluid described above in the description of Sample Composition No. 2).

Sample Composition No. 7 comprised a well fluid of the present invention (having the same composition as the well fluid described above in the description of Sample Composition No. 2).

Sample Composition No. 8 comprised an oil-based drilling fluid containing 12.4 lb/gal of Nova Plus drilling fluid.

Sample Composition No. 9 comprised 95% by volume of an oil-based drilling fluid (having the same composition as Sample Composition No. 8) and 5% by volume of a well fluid of the present invention having a density of 13.0 lb/gallon comprising an emulsion that comprised 108 grams ESCAID 110, 10 grams surfactant, 2.16 grams organophilic clay, and 135 grams of water mixed with 250 grams of Portland Cement and 88 grams of Hi-Dense No. 4 as a weighting agent.

Sample Composition No. 10 comprised 75% by volume of an oil-based drilling fluid (having the same composition as Sample Composition No. 8) and 25% by volume of a well fluid of the present invention (having the same composition as the well fluid described above in the description of Sample Composition No. 9).

Sample Composition No. 11 comprised 50% by volume of an oil-based drilling fluid (having the same composition as Sample Composition No. 8) and 50% by volume of a well fluid of the present invention (having the same composition as the well fluid described above in the description of Sample Composition No. 9).

Sample Composition No. 12 comprised 25% by volume of an oil-based drilling fluid (having the same composition as Sample Composition No. 8) and 75% by volume of a well fluid of the present invention (having the same composition as the well fluid described above in the description of Sample Composition No. 9).

Sample Composition No. 13 comprised a well fluid of the present invention (having the same composition as the well fluid of Sample Composition No. 9).

The results are set forth in Table 1 below.

TABLE 1

| Sample Fluid | Yield Point (lb/100 ft$^2$) |
|---|---|
| Sample Composition No. 1 | 10 |
| Sample Composition No. 2 | 8 |
| Sample Composition No. 3 | 5 |
| Sample Composition No. 4 | 5 |
| Sample Composition No. 5 | 5 |
| Sample Composition No. 6 | 8 |
| Sample Composition No. 7 | 7 |
| Sample Composition No. 8 | 7 |
| Sample Composition No. 9 | 6 |
| Sample Composition No. 10 | 4 |
| Sample Composition No. 11 | 4 |
| Sample Composition No. 12 | 5 |
| Sample Composition No. 13 | 10 |

Accordingly, the above example demonstrates, inter alia, that the well fluids of the present invention are compatible with conventional oil-based drilling fluids, and that the addition of the well fluids of the present invention to such oil-based drilling fluids does not cause an appreciable increase in gelation or viscosity.

Therefore, the present invention is well adapted to carry out the objects and attain the ends and advantages mentioned as well as those which are inherent therein. While the invention has been depicted and described by reference to embodiments of the invention, such a reference does not imply a limitation on the invention, and no such limitation is to be inferred. The invention is capable of considerable modification, alternation, and equivalents in form and function, as will occur to those ordinarily skilled in the pertinent arts and having the benefit of this disclosure. The depicted and described embodiments of the invention are only, and are not exhaustive of the scope of the invention. Consequently, the invention is intended to be limited only by the spirit and scope of the appended claims, giving full cognizance to equivalents in all respects.

What is claimed is:

1. A method of cementing a well bore, comprising:
   introducing a well fluid comprising hydraulic cement, an oil viscosifier, and an invert emulsion into a well bore containing an oil-based drilling fluid so as to displace at least a portion of the oil-based drilling fluid from the well bore;
   disposing a pipe string in the well bore so as to create an annulus between the pipe string and the well bore such that a portion of the well fluid resides in the annulus and a portion of the well fluid resides in the pipe string;
   flowing a cement composition through the pipe string and into the annulus so as to displace the portion of the well fluid out of the pipe string and into the annulus; and
   allowing both the well fluid and cement composition to develop compressive strength along a desired length of the well bore.

2. The method of claim 1, wherein the invert emulsion comprises oil, water, and a surfactant.

3. The method of claim 2, wherein the surfactant is an emulsifying surfactant.

4. The method of claim 3, wherein the emulsifying surfactant comprises a Tallow di-amine substituted with 3 moles of ethylene oxide.

5. The method of claim 4, wherein the emulsifying surfactant comprises about 60% active ingredient.

6. The method of claim 3, wherein the emulsifying surfactant is present in the well fluids of the present invention in an amount in the range of from about 5% to about 15% by weight of the oil.

7. The method of claim 2, wherein the oil comprises a long-chain hydrocarbon.

8. The method of claim 2, wherein the oil is present in the well fluids of the present invention in an amount in the range of from about 40% to about 70% by volume of the invert emulsion.

9. The method of claim 2, wherein the water is present in an amount in the range of from about 30% to about 60% by volume of the invert emulsion.

10. The method of claim 1, wherein the well fluid and cement composition provide zonal isolation along the length of the well bore.

11. The method of claim 10, wherein the well fluid and cement composition form a cement sheath along the length of the well bore.

12. The method of claim 11, wherein the cement sheath has a volume, and wherein the well fluid comprises between about 0.01% and about 75% of the volume of the cement sheath.

13. The method of claim 1, wherein the invert emulsion is present in the well fluid in an amount in the range of from about 20% to about 60% by weight.

14. The method of claim 1, wherein the well fluid has a density in the range of from about 11 to about 17 pounds per gallon.

15. The method of claim 1, wherein the hydraulic cement is present in the well fluids of the present invention in an amount in the range of from about 25% to about 60% by weight of the well fluid.

16. The method of claim 1, wherein the hydraulic cement comprises a Portland cement.

17. The method of claim 1, wherein the hydraulic cement comprises ASTM Class C fly ash, a mixture of ASTM Class F fly ash and hydrated lime, a mixture of vitrified shale and hydrated lime, or mixtures thereof.

18. The method of claim 1, wherein the hydraulic cement is present in an amount in the range of from about 50% to about 70% by weight of the fluid.

19. The method of claim 1, wherein the oil viscosifier is an organophilic clay.

20. The method of claim 1, wherein the oil viscosifier is present in an amount sufficient to provide a fluid having a desired viscosity.

21. The method of claim 1, wherein the oil viscosifier is present in an amount in the range of from about 0.01% to about 2% by weight of the invert emulsion.

22. The method of claim 1, wherein the well fluid further comprises a set retarder.

23. The method of claim 22, wherein the set retarder is present in an amount less than about 4% by weight of the hydraulic cement.

24. The method of claim 22, wherein the set retarder is present in an amount less than about 1% by weight of the hydraulic cement.

25. The method of claim 1, wherein the well fluid further comprises a fluid loss control additive, a salt, fumed silica, a weighting agent, microspheres, a defoaming agent, or a mixture thereof.

26. The method of claim 1, wherein the well fluid has a density in the range of from about 11 to about 17 pounds per gallon; wherein the invert emulsion comprises oil, water, and a surfactant; wherein the surfactant comprises an emulsifying surfactant comprising a Tallow di-amine substituted with 3 moles of ethylene oxide; wherein the surfactant is present in the well fluid in an amount in the range of about 5% to about 15% by weight of the oil; wherein the invert emulsion is present in the well fluid in an amount in the range of from about 20% to about 60% by weight; wherein the oil comprises a long-chain hydrocarbon and is present in the well fluid in an amount in the range of from about 40% to about 70% by volume of the invert emulsion; and wherein the water is present in an amount in the range of from about 30% to about 60% by volume of the invert emulsion.

27. A method of cementing a well bore in a subterranean formation, comprising:
using a cement composition to form a portion of a cement sheath along the well bore; and
using a well fluid to form a portion of the cement sheath along the well bore, wherein the well fluid comprises a hydraulic cement, an oil viscosifier, and an invert emulsion.

28. The method of claim 27 wherein the invert emulsion comprises oil, water, and a surfactant.

29. The method of claim 28, wherein the surfactant is an emulsifying surfactant.

30. The method of claim 29, wherein the emulsifying surfactant comprises a Tallow di-amine substituted with 3 moles of ethylene oxide.

31. The method of claim 29 wherein the emulsifying surfactant comprises about 60% active ingredient.

32. The method of claim 29, wherein the emulsifying surfactant is present in the well fluids of the present invention in an amount in the range of from about 5% to about 15% by weight of the oil.

33. The method of claim 28, wherein the oil comprises a long-chain hydrocarbon.

34. The method of claim 28, wherein the oil is present in the well fluids of the present invention in an amount in the range of from about 40% to about 70% by volume of the invert emulsion.

35. The method of claim 28, wherein the water is present in an amount in the range of from about 30% to about 60% by volume of the invert emulsion.

36. The method of claim 27, wherein the cement sheath provides zonal isolation along the length of the well bore.

37. The method of claim 27, wherein the cement sheath has a volume, and wherein the well fluid comprises between about 0.01% and about 75% of the volume of the cement sheath.

38. The method of claim 27, wherein the invert emulsion is present in the well fluid in an amount in the range of from about 20% to about 60% by weight.

39. The method of claim 27, wherein the well fluid has a density in the range of from about 11 to about 17 pounds per gallon.

40. The method of claim 27, wherein the hydraulic cement is present in the well fluids of the present invention in an amount in the range of from about 25% to about 60% by weight of the well fluid.

41. The method of claim 27, wherein the hydraulic cement comprises a Portland cement.

42. The method of claim 27, wherein the hydraulic cement comprises ASTM Class C fly ash, a mixture of ASTM Class F fly ash and hydrated lime, a mixture of vitrified shale and hydrated lime, or mixtures thereof.

43. The method of claim 27, wherein the hydraulic cement is present in an amount in the range of from about 50% to about 70% by weight of the fluid.

44. The method of claim 27, wherein the oil viscosifier is an organophilic clay.

45. The method of claim 27, wherein the oil viscosifier is present in an amount sufficient to provide a fluid having a desired viscosity.

46. The method of claim 27, wherein the oil viscosifier is present in an amount in the range of from about 0.01% to about 2% by weight of the invert emulsion.

47. The method of claim 27, wherein the well fluid further comprises a set retarder.

48. The method of claim 47, wherein the set retarder is present in an amount less than about 4% by weight of the hydraulic cement.

49. The method of claim 47, wherein the set retarder is present in an amount less than about 1% by weight of the hydraulic cement.

50. The method of claim 27, wherein the well fluid further comprises a fluid loss control additive, a salt, fumed silica, a weighting agent, microspheres, a defoaming agent, or a mixture thereof.

51. The method of claim 27, wherein the well fluid has a density in the range of from about 11 to about 17 pounds per gallon; wherein the invert emulsion comprises oil, water, and a surfactant; wherein the surfactant comprises an emulsifying surfactant comprising a Tallow di-amine substituted with 3 moles of ethylene oxide; wherein the surfactant is present in the well fluid in an amount in the range of about 5% to about 15% by weight of the oil; wherein the invert emulsion is present in the well fluid in an amount in the range of from about 20% to about 60% by weight; wherein the oil comprises a long-chain hydrocarbon and is present in the well fluid in an amount in the range of from about 40% to about 70% by volume of the invert emulsion; and wherein the water is present in an amount in the range of from about 30% to about 60% by volume of the invert emulsion.

* * * * *